(12) United States Patent
Miyazawa (10) Patent No.: US 7,585,239 B2
(45) Date of Patent: Sep. 8, 2009

(54) TRANSMISSION CHAIN

(75) Inventor: Toshihiko Miyazawa, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 638 days.

(21) Appl. No.: 11/200,612

(22) Filed: Aug. 10, 2005

(65) Prior Publication Data

US 2006/0079363 A1 Apr. 13, 2006

(51) Int. Cl.
  *F16H 7/06* (2006.01)
  *F16G 13/02* (2006.01)
(52) U.S. Cl. .................. 474/157; 474/155; 474/156; 474/206
(58) Field of Classification Search .......... 474/155, 474/156, 157, 206
  See application file for complete search history.

(56) References Cited

U.S. PATENT DOCUMENTS

| | | | | |
|---|---|---|---|---|
| 2,069,591 | A * | 2/1937 | Pierce | 474/217 |
| 4,186,617 | A * | 2/1980 | Avramidis et al. | 474/229 |
| 4,227,425 | A * | 10/1980 | Bendall | 474/213 |
| 5,372,554 | A * | 12/1994 | Okuda | 474/206 |
| 5,453,059 | A * | 9/1995 | Avramidis et al. | 474/212 |
| 6,485,385 | B2 * | 11/2002 | Shimaya | 474/213 |
| 6,663,522 | B2 * | 12/2003 | Horie | 474/212 |
| 7,201,687 | B2 * | 4/2007 | Mott et al. | 474/157 |
| 2002/0119853 | A1 * | 8/2002 | Horie | 474/213 |
| 2005/0049098 | A1 * | 3/2005 | Butterfield | 474/212 |

FOREIGN PATENT DOCUMENTS

| | | |
|---|---|---|
| DE | 197 47 163 | 4/1998 |
| GB | 821480 | 10/1959 |
| JP | 10-132038 | 5/1998 |
| JP | 11270638 | 10/1999 |
| JP | 2000002304 | 1/2000 |

\* cited by examiner

*Primary Examiner*—Robert A Siconolfi
*Assistant Examiner*—Thomas W Irvin
(74) *Attorney, Agent, or Firm*—Dann, Dorfman, Herrell and Skillman; Henry H. Skillman (57) ABSTRACT

A transmission chain for a transmission having a drive sprocket and a driven sprocket with chain guides between the sprockets, at least one of the guides having a curved surface on which one of the runs of the chain slides in its travel between the sprockets. The chain has inner and outer link plates which respectively mount bushings and connecting pins which pass through the bushings with a clearance. The link plates have sliding surfaces which slide on the guide. The transmission chain has a chain pitch defined as $P_1$, and the maximum clearance formed between the connecting pins and the bushings is defined as C. The sliding surfaces are curved like the guide and the curved surfaces of one of the outer and inner link plates, has a curve width X, and the curved surface of the other of the inner and outer link plates, has a curve width Y. The widths X and Y are selected relative to the chain pitch of $P_1$ and the maximum clearance C to reduce or eliminate the loss of a film of lubricating oil between the sliding surfaces of the links and the curved surface of the guide as the chain travels from the drive sprocket to the driven sprocket.

4 Claims, 11 Drawing Sheets

TRANSMISSION CHAIN

TECHNICAL FILED

The present invention relates to a transmission chain, and more specifically relates to a transmission chain comprising bushings press-fitted into a pair of inner link plates and connecting pins press-fitted into a pair of outer link plates, the pins passing through the bushings in a loosely fitted state. The link plates have curved surfaces, adapted during travel to slide on a curved surface of a chain guide and formed on chain guide-opposing-side peripheral edge portions of said outer link plate and inner link plate,

BACKGROUND OF THE INVENTION

A transmission chain which reduces friction on a chain guide, has been well known. In such chains by curving a back surface of a link plate in accordance with the curvature of the chain guide, the bearing pressure of the chain, generated when the chain slides on the chain guide, was made small (see for example Japanese Laid-open Patent Publication No. Hei. 10-132038).

Figure 4:
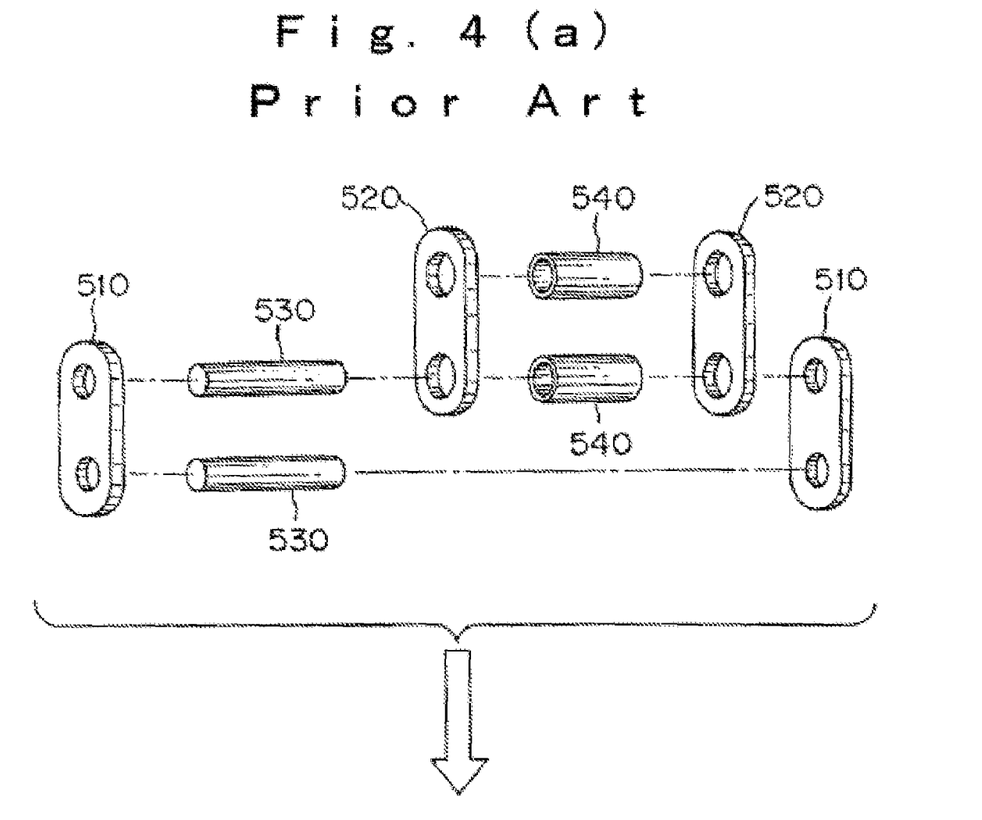
FIG. 4(a) is an exploded view showing two links of an example of a conventional bushing chain.
FIG. 4(b) is a perspective view of the two links when assembled.

Namely, as shown in FIG. 4, such a transmission chain 500 is comprised of bushings 540 press-fitted in a pair of inner link plates 520 and connecting pins press-fitted in a pair of outer link plates, and passing through the bushings 540 in a loosely fitted state.

Problems to be Solved by the Invention

Figure 5:
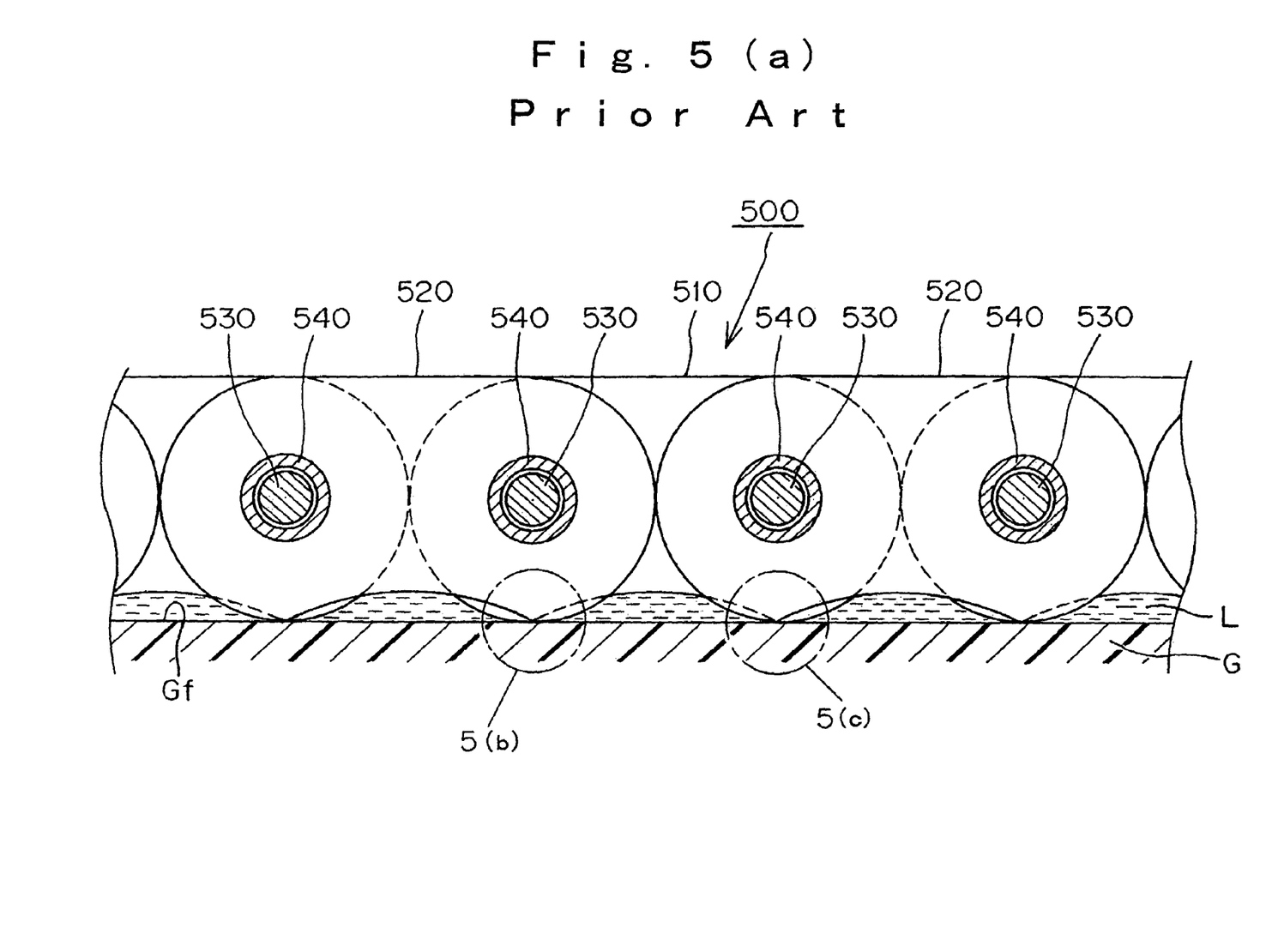
FIG. 5(a) is an enlarged cross-sectional view of a plate portion of the conventional bushing chain.
FIGS. 5(b) and 5(c) are further enlarged localized sectional views of the chain at locations 5(b) and 5(c) in FIG. 5(a)
Figure 5B:
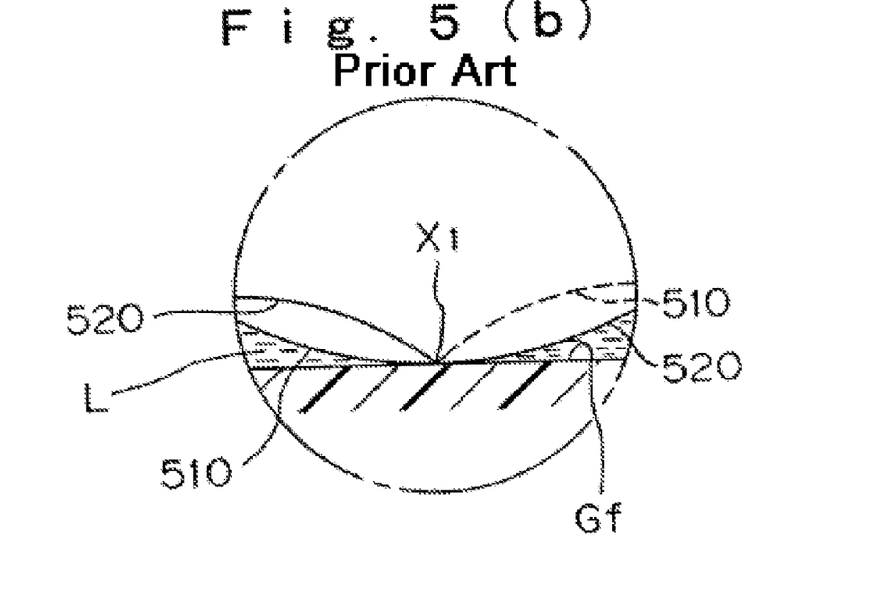
Figure 5C:
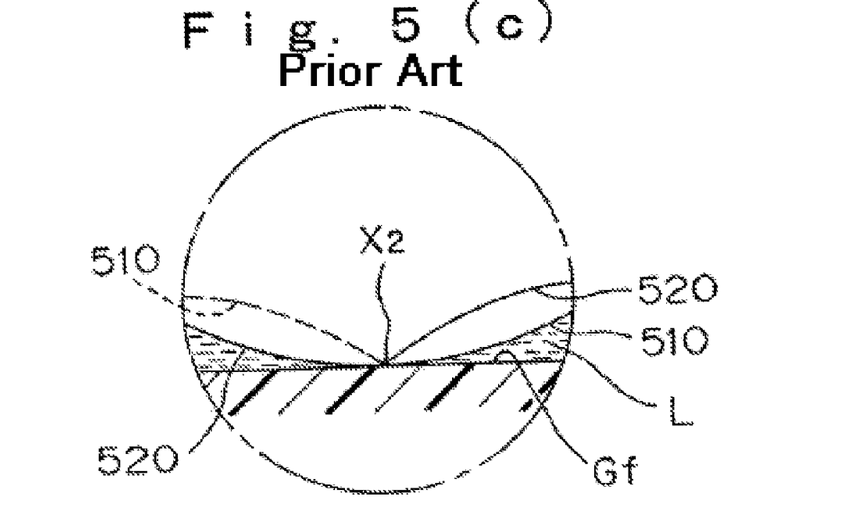
Figure 6A:
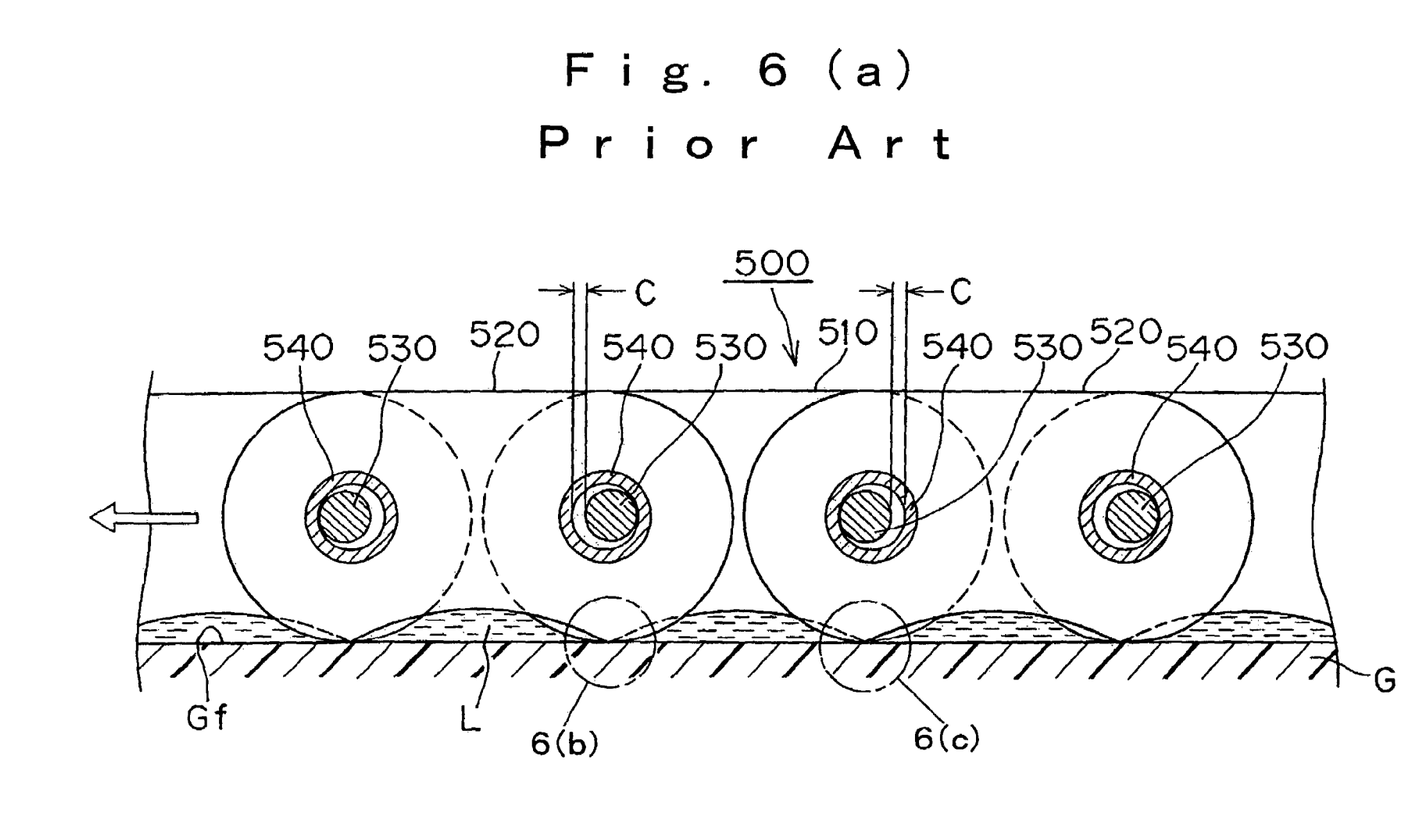
FIG. 6(a) is an enlarged cross-sectional view of the chain of FIG. 5(a), viewed in a state where the links are dragged between sprockets in the traveling of a conventional bushing chain.
Figure 6B:
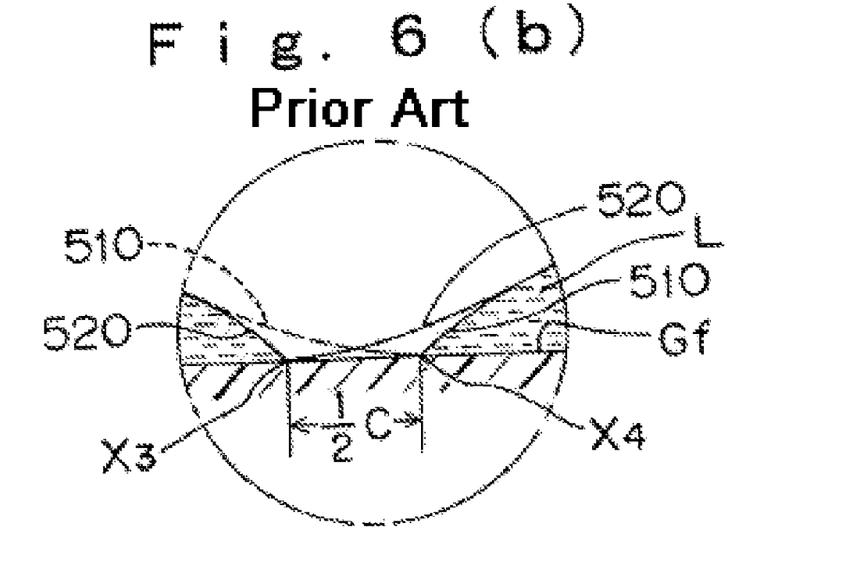
FIGS. 6(b) and 6(c) are further enlarged localized sectional views of the chain at locations 6(b) and 6(c) in FIG. 6(a).
Figure 6C:
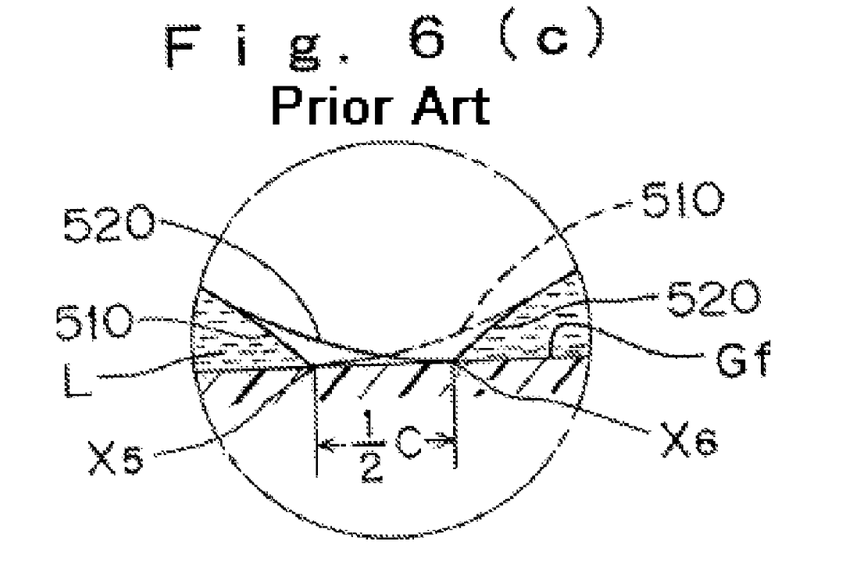

However, in such a conventional transmission chain 500, as shown in an enlarged view in FIGS. 5(*a*), 5(*b*) and 5(*c*), when the center of the diameter of a connecting pin 530 and the hole center of a bushing 540 are concentric with each other, positions where side edge portions of the link plates, which slide along a chain guide surface Gf of a chain guide G, make contact with the chain guide surface, are two in total {see points X1 and X2 in FIGS. 5(*b*) and 5(*c*)}. However, as shown in FIGS. 6(*a*), 6(*b*) and 6(*c*), when the transmission chain 500 is being dragged as in traveling of the chain between sprockets, positions where side edge portions of the link plates, which slide along a chain guide surface Gf of a chain guide G, make contact with the chain guide surface, are four in total (see points X3, X4, X5 and X6) due to the measurable clearance formed between the connecting pin 530 and the bushing 540, so that the number of contact positions is increased.

Namely, since in the conventional transmission chain 500, the clearance C between the connecting pin 530 and the bushing 540 is not taken into consideration, when the transmission chain 500 is being dragged as in traveling, the spacings of the contact points are increased and lubricating oil L is not held in the space of ½ C due to the influence of the clearance C. Thus any oil film is broken in this space. And when an amount of held lubricating oil L is insufficient, there is a problem of generation of friction loss during chain travel.

Therefore, the present inventor has pointed out that when a transmission chain is being dragged, points where both a sliding curved surface of a chain guide and a chain guide opposing side peripheral edge portions in which curved portions of an outer link plate and an inner link plate, opposed to the chain guide, make points of contact, the spacing between the points where the link plates and chain guide make contact with each other is increased by reason of the clearance between the connecting pin and the bushing as compared with a case where the center of the connecting pin and the center of the bushing hole diameter are concentric, as when the chain is on the sprocket. The measurable clearance is provided to permit the bushings to rotate on the connecting pins as the chain is dragged over the curved surface of the chain guide.

Accordingly, the object of the present invention is to solve the above-mentioned prior art problems or to provide a transmission chain, in which the interruption of a lubricating oil film between a traveling chain and a sliding curved surface of the chain guide by reason of the clearance between the connecting pin and the bushing is reduced, so that sliding resistance of the chain can be reduced and an amount of wear on a sliding curved surface of a chain guide can be reduced.

Means for Solving the Problems

The above-mentioned object is attained by the present invention. The chain comprises bushings press-fitted in a pair of inner link plates and connecting pins press-fitted in a pair of outer link plates, the connecting pins passing through the bushings in a loosely fitted state. Curved surfaces, opposed to a chain guide, are formed on chain guide-opposing-side peripheral edge portions of said outer link plate and inner link plate, which travel along a sliding curved surface of the chain guide. The invention is characterized in that if chain pitches of said outer link plate and inner link plate are defined as $P_1$, and the maximum measurable clearance formed between said connecting pin and said bushing is defined as C, each of said curved surfaces of one of said outer inner link plates, opposed to the chain guide, is formed with a curve width X, which satisfies a requirement of: $P_1 \leq X \leq (P_1+C)$ with reference to the center of the longitudinal link plate, and the curved surface of the other of said inner and outer link plates, opposed to the chain guide, is formed with a curve width Y, which satisfies an equation of: $P_1+\{(P_1+C)-X\}=Y$. By adjusting the widths of the curved surfaces of the inner and outer link plates to compensate for the clearance between the pin and the bushing, interruption of the lubricating film is reduced. The adjustment is made relative to the maximum clearance, and need not be the same in the inner and outer link plates.

Further, according to another feature of the invention, the respective non-chain guide-opposing-side peripheral edge portions of said outer link plate and inner link plate are formed to be flat surfaces in addition to the curved chain guide opposing surfaces having the widths X and Y.

EFFECTS OF THE INVENTION

According to the invention, a transmission chain, comprising bushings press-fitted in a pair of inner link plates and connecting pins press-fitted in a pair of outer link plates, the pins passing through the bushings in a loosely fitted state, has curved surfaces, opposed to a chain guide and formed on chain guide-opposing-side peripheral edge portions of said outer link plate and inner link plate, traveling along a sliding curved surface of the chain guide. The curved surfaces are characterized in that if chain pitches of said outer link plate and inner link plate are defined as $P_1$, the maximum clearance formed between said connecting pin and said bushing is defined as C, and one of said curved surfaces of said outer link plate and inner link plate, opposed to the chain guide, is formed with a curve width X, which satisfies a requirement of: $P_1 \leq X \leq (P_1+C)$ with reference to the center of the longitudinal link plate, and the curved surface of the other of said outer and inner link plates, opposed to the chain guide, is formed with a curve width Y, which satisfies an equation of: $P_1+\{(P_1+C)-X\}=Y$, when the transmission chain is being dragged as in traveling, an increase in positions where both a sliding curved surface of a chain guide and a chain guide opposing side peripheral edge portions in which curved portions of an outer link plate and an inner link plate, opposed to the chain guide, are formed, make contact with each other, can be prevented. Thus the interruption of forming a lubricating oil film between a traveling chain and a sliding curved surface of the chain guide due to the clearance between the connecting pin and the bushing is suppressed, so that sliding resistance of the chain can be reduced and an amount of wear on a sliding curved surface of a chain guide can be reduced.

Further, according to the invention, since the respective non-chain guide-opposing-side peripheral edge portions of said outer link plate and inner link plate are formed to be flat surfaces, in addition to the above-described effects of the invention, even if a curved portion opposed to the chain guide is formed on a chain guide-opposing side peripheral edge portion of a link plate, which slides along a sliding curved surface of the chain guide, the strength of the link plate can be sufficiently maintained by making the remaining non-chain guide opposing side peripheral edge portions of the link plates flat surfaces.

PREFERRED MODE FOR CARRYING OUT THE INVENTION

A preferred embodiment of the present invention will be described with reference to attached drawings.

FIG. 1 is an exaggerated view of an embodiment of a transmission chain according to the present invention. In this case, it is noted that a transmission chain of the present invention was applied to a chain drive system for an engine in an automobile or the like. Further, in the example of FIG. 1, as an example of a transmission chain 100 a bushing chain is adopted.

In FIG. 1, a transmission chain 100, which is one example of the present invention, is endlessly wrapped between a driving sprocket (also called as a crankshaft sprocket) S1 and a driven sprocket (also called as a camshaft sprocket) S2 and transmits rotation of the driving sprocket S1 to the driven sprocket S2.

Figure 1A:
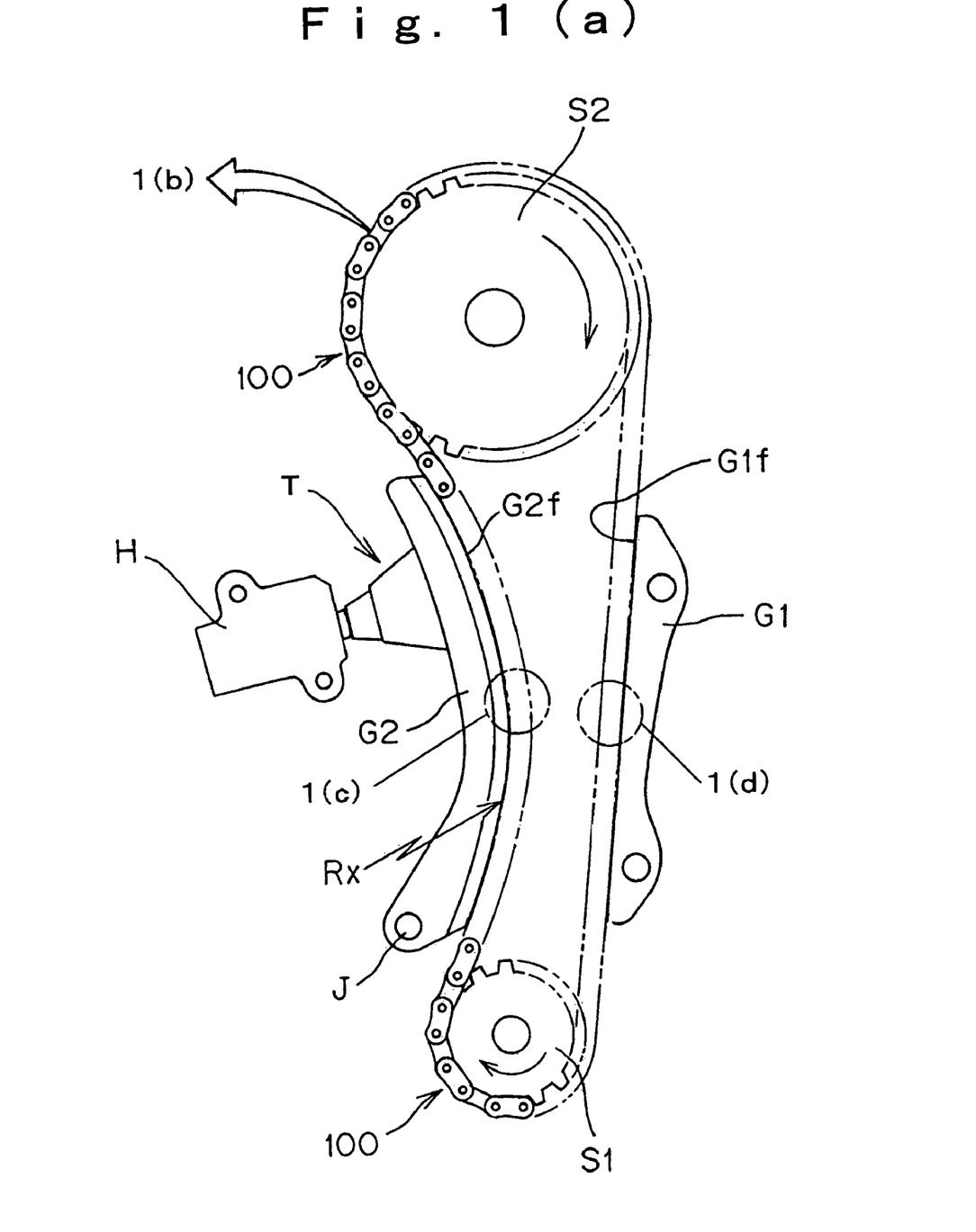
FIG. 1(a) is a view showing an embodiment of a transmission chain according to the present invention in use.

And a first chain guide G1, which is linear is arranged on an outer peripheral side of a tension run portion of the transmission chain 100 in the present invention. This linear chain guide G1 limits tension run vibration of the transmission chain 100 during traveling thereof by sliding chain guide-opposed side peripheral edge portions of the outer link plate 110 and inner link plate 120 of the transmission chain 100 along the sliding flat surface (also called a shoe surface).

Further, a tensioner T is arranged on an outer peripheral side of a transmission chain 100 return or slack run. This tensioner T is comprised of a second chain guide (also called as a tensioner lever) G2, which is arc-shaped, one end portion of which is pivotally supported by a pivot J and a tensioner body H, which biases a sliding curved surface of the other end portion of the arc-shaped chain guide G2 and a back surface of the opposite side to press the sliding curved surface (also called as a shoe surface) G2f against the chain guide-opposed side peripheral edge portions of the outer link plate 110 and inner link plate 120 of the transmission chain 100. The tensioner T removes slack of the transmission chain 100 to limit vibration of the transmission chain 100 return run during traveling of the chain.

It is noted that in the arc-shaped chain guide G2 a sliding curved surface G2f is curved at a predetermined curvature Rx. Further, the sliding flat surface G1f portion of the linear chain guide G1 and a sliding curved surface G2f of the arc-shaped chain guide G2 are each composed of a synthetic resin material or a synthetic rubber material or the like, having elasticity.

However, in the transmission chain 100 of the present invention shown in FIG. 1, there is a connecting pin 130 press-fitted into the outer link plate 110 and a bushing 140 press-fitted into the inner link plate 120. As shown in FIGS. 1 and 1(b), the bushings 140 engage between the teeth of the sprockets S1 and S2, and the inner and outer link plates straddle the teeth of the sprockets. To this end, the inner and outer link plates are spaced apart a distance greater than the thickness of the sprocket teeth. The pin passes through the bushing with a measurable clearance, and taking the clearance into consideration, curved portions each having the same or substantially the same curvature Ry as the curvature Rx of the arc-shaped chain guide G2 are respectively formed for a predetermined width of each chain guide opposed side peripheral edge portion of the outer link plate 110 and inner link plate 120, which slide along the sliding curved surface G2f of the arc-shaped chain guide G2.

Figure 1B:
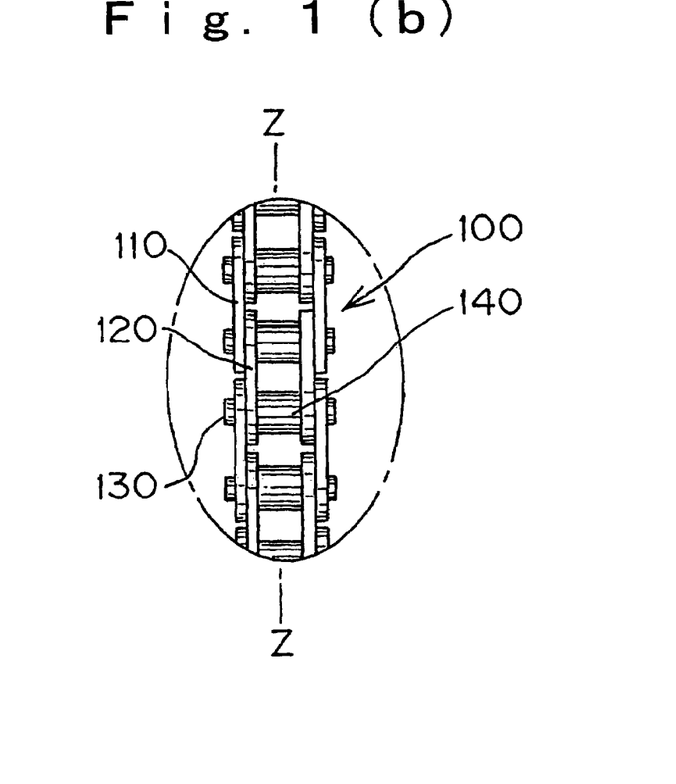
FIG. 1(b) is a fragmentary elevational view of the chain at the location 1(b) in FIG. 1(a)
Figure 1C:
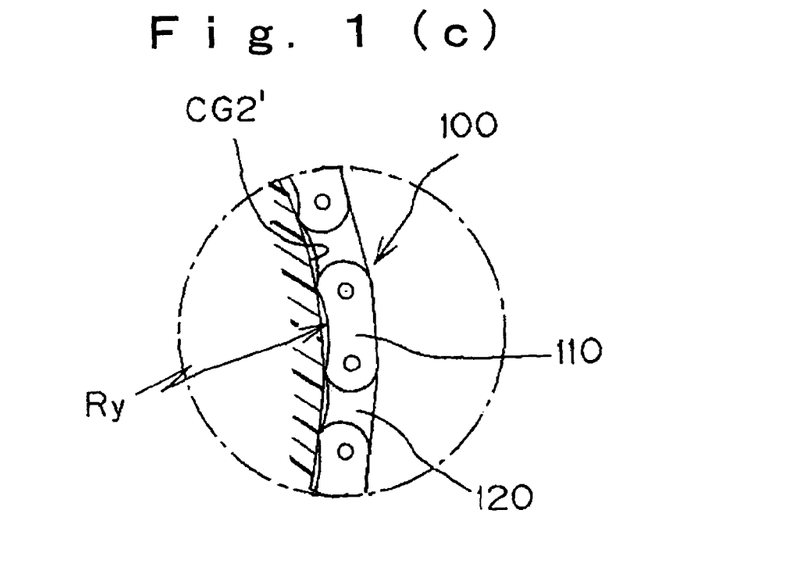
FIGS. 1(c) and 1(d) are localized sectional views of the chain at the locations 1(c) and 1(d) respectively.
Figure 1D:
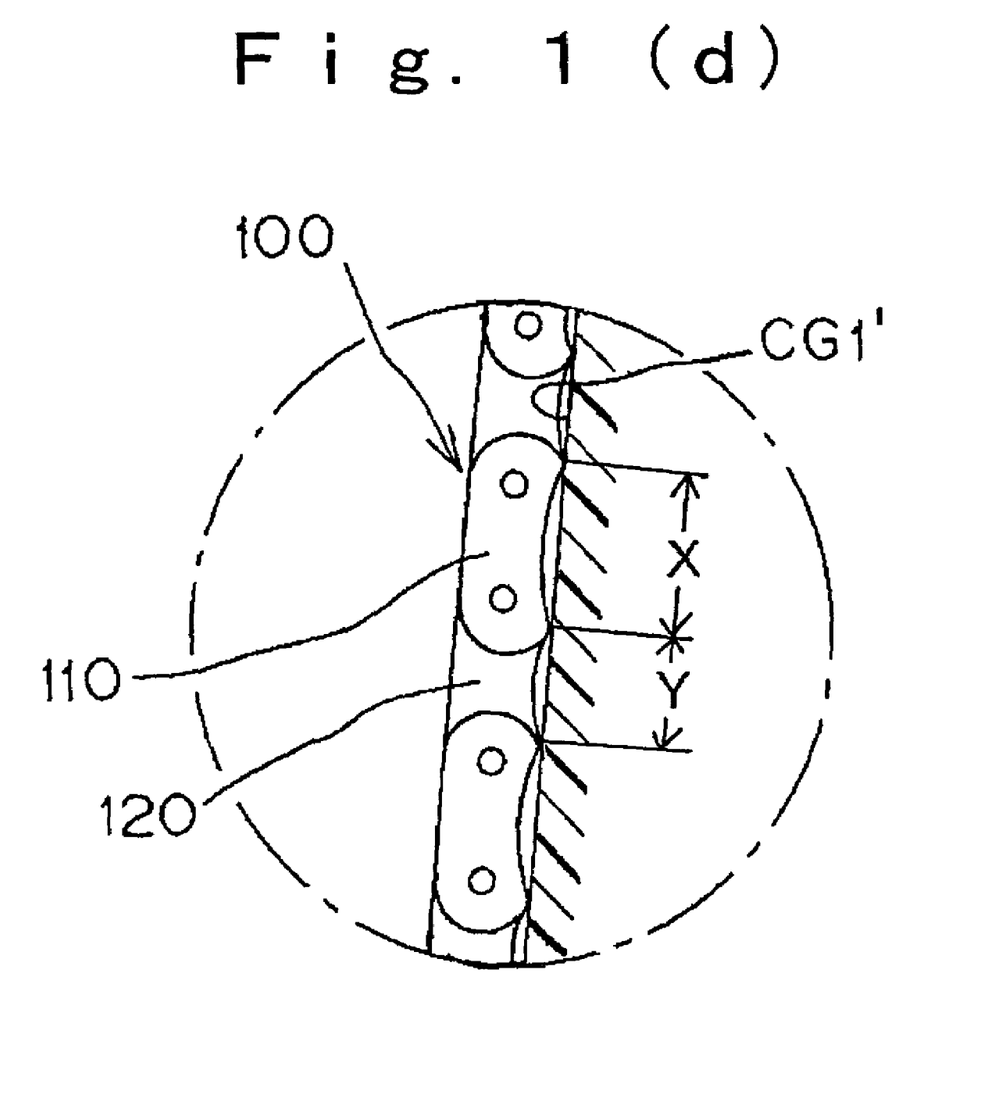

More specifically, with reference to FIGS. 1(b), 2(a), and 2(b), the chain pitches of the outer link plate 110 and the inner link plate 120 are defined as $P_1$, and the maximum clearance formed between the connecting pin 130 and the bushing 140 is defined as C. Then in a case where the center of the longitudinal direction of the plate is based, any one of the curved surfaces of the outer link plate 110 and the inner link plate 120 opposed to a chain guide, is formed with a curve width X, which satisfies the following Equation 1, and the curved surface of the other of said link plates 110 and 120, opposed to the chain guide, is formed with a curve width Y, which satisfies the following Equation 2.

$$P_1 \leq X \leq (P_1+C) \quad \text{[Equation 1]}$$

$$P_1+\{(P_1+C)-X\}=Y \quad \text{[Equation 2]}$$

Next, a concrete example of the transmission chain 100 according to the present invention will be described by limiting the above-mentioned X and Y to specified values.

Figure 2:
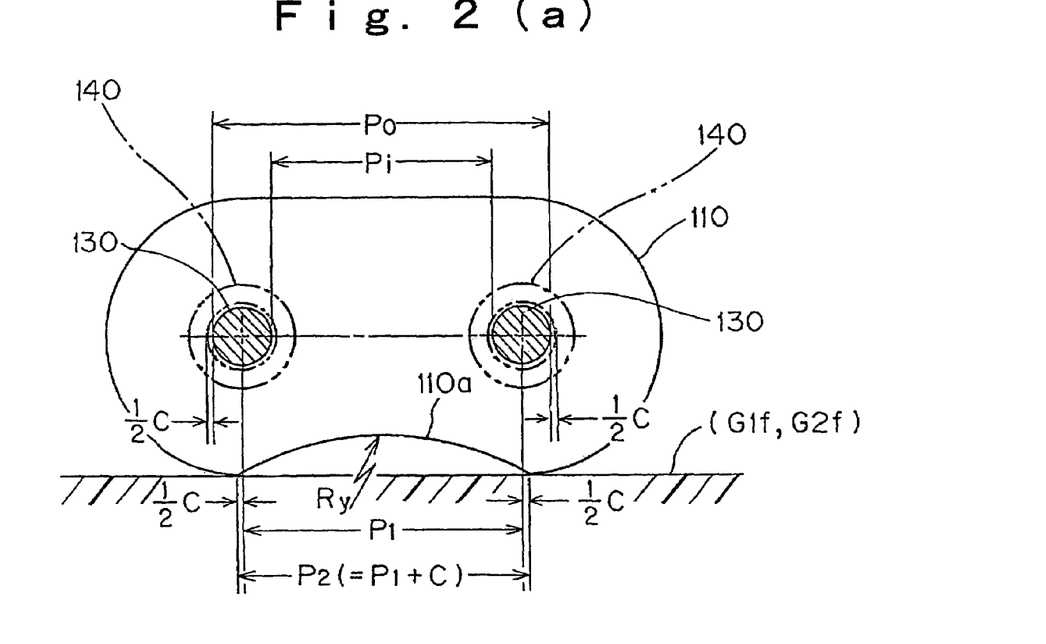
FIGS. 2(a) and 2(b) are enlarged cross-sectional views respectively taken along the line Z-Z in FIG. 1(b) showing examples of an outer link plate and an inner link plate of the transmission chain according to the present invention at a location where the plate portions of the chain are engaged on a sprocket.
Figure 3:
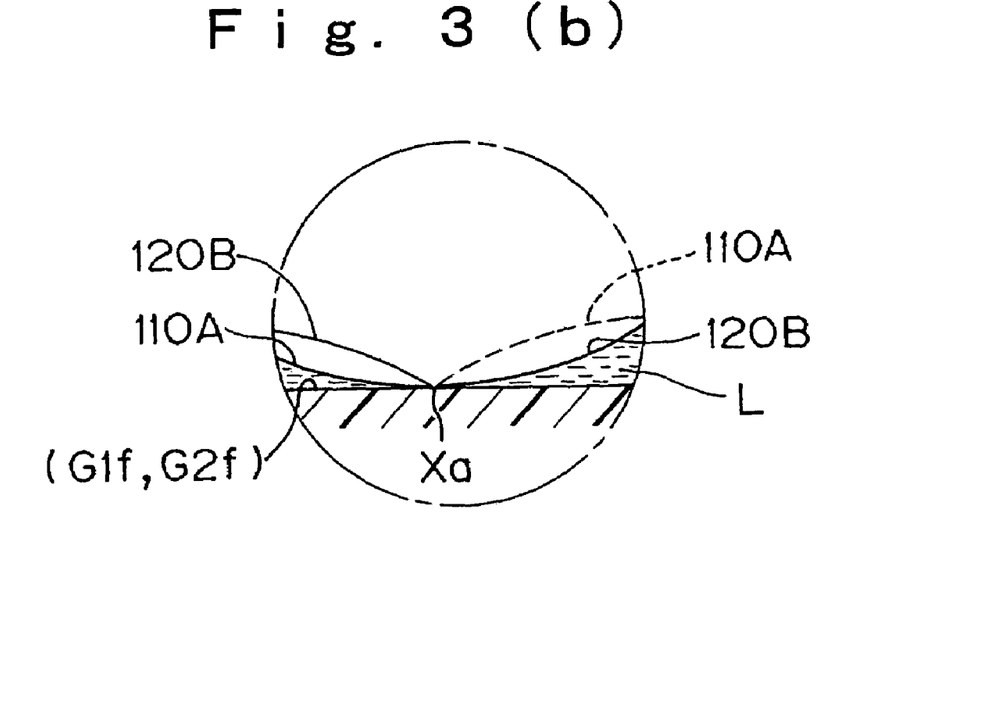
FIG. 3(a) is an enlarged cross-sectional view, similar to FIG. 2(a), of a traveling transmission chain according to the present invention viewed in a position where the plate portion is being dragged during travel of the chain between sprockets.
FIGS. 3(b) and 3(c) are localized sectional views of the chain at locations 3(b) and 3(c) in FIG. 3(a)
Figure 3A:
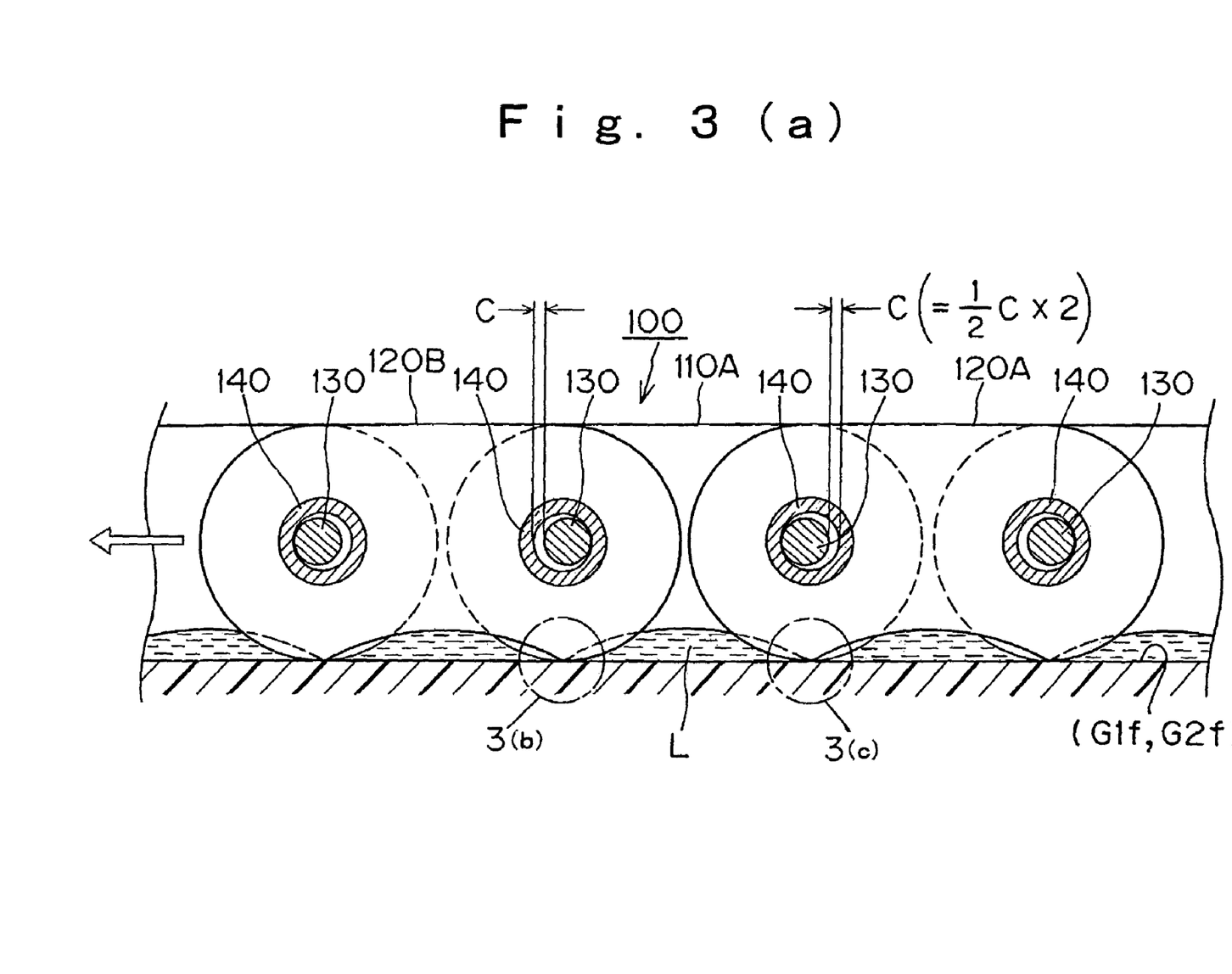

FIGS. 2(*a*), and 2(*b*) respectively are enlarged cross-sectional view of an outer link plate 110 and an inner link plate 120 of the transmission chain 100 shown in FIG. 1(*a*). Further, a curved surface portion opposed to a chain guide is exaggeratedly shown in the figures for explanation.

As shown in FIG. 2(*a*), in the outer link plate 110 of the transmission chain 100 of the present invention, the both ends of the link plate 110 are each formed in a substantially semicircular shape having a slightly shorter half circumference, and a curved surface portion 110*a* opposed to a chain guide is formed on the outer peripheral side of a chain traveling passage that is on a chain guide-opposing side peripheral portion of the link plate. This peripheral portion slides along a sliding flat surface G1*f* of the linear chain guide G1 and along a sliding curved surface G2*f* of the arc-shaped chain guide G2. On the other hand, a non-chain guide-opposing side peripheral portion of the link plate, which does not slide along a sliding flat surface G1*f* and a sliding curved surface G2*f*, is formed in a flat surface shape on the inner peripheral side of the chain traveling passage.

Specifically, when plate pitches of the outer link plate and the inner link plate 120 are each defined as $P_1$, the maximum clearance width formed between the connecting pin 130 and the bushing 140 is defined as C, a curved surface portion 110*a* opposed to a chain guide and having the same or substantially the same curvature Ry as the curvature Rx of the arc-shaped chain guide G2 is formed in a width of P2, which satisfies the following Equation 3, with reference to the center of the longitudinal outer link plate 110.

$$P_1+C=P_2 \quad \text{[Equation 3]}$$

Further, in the inner link plate 120 of the transmission chain 100 of the present invention, the both ends of the link plate 120 are each formed in a semicircular shape, and a curved surface portion 120*a* opposed to a chain guide is formed on the outer peripheral side of a chain traveling passage that is on a chain guide-opposing side peripheral portion of the link plate, which slides along a sliding flat surface G1*f* of the linear chain guide G1 and along a sliding curved surface G2*f* of the arc-shaped chain guide G2. On the other hand, a non-chain guide-opposing side peripheral portion of the link plate, which does not slide along a sliding flat surface G1*f* and a sliding curved surface G2*f*, is formed in a flat surface shape on the inner peripheral side of the chain traveling passage.

It is noted that specifically the curved surface portion 120(*a*) opposed to the chain guide and having the same or substantially the same curvature Ry as the curvature Rx of the arc-shaped chain guide G2, is formed with reference to the center of the longitudinal inner link plate 110.

It is noted that P1 (chain pitch) is obtained by the following equation 4 for example.

$$(Po+Pi)/2=P_1 \quad \text{[Equation 4]}$$

where Po is the outer pitch of the connecting pin, and Pi is the inner pitch of the connecting pin.

As mentioned above, even if curved portions (110*a*, 120*a*) opposed to chain guides are formed on chain guide-opposing side peripheral edge portions of link plates (110, 120), which slide along a sliding curved surface G2*f* of the arc-shaped chain guide G2, the strengths of the link plates can be sufficiently maintained by making the remaining non-chain guide opposing peripheral edge portions to be flat surface shapes.

FIG. 3(*a*) is an enlarged cross-sectional view viewed in a case where, in the transmission chain 100 comprised of the outer link plate 110 and the inner link plate 120 shown in FIGS. 2(*a*) and 2(*b*), a few traveling link plate portions (an outer link plate 110A, an inner link plate 120A adjacent to this outer link plate 110A and an inner link plate 120B) are dragged between sprockets of the chain drive system shown in FIG. 1(*a*).

As shown in FIG. 3, even if the transmission chain 100 of the present invention is in a state where it is dragged in the chain drive system shown in FIG. 1 as in the traveling of the chain between sprockets, with the construction of the outer link plate 110 and the inner link plate 120 shown in FIGS. 2(*a*) and 2(*b*), an increase in contact positions between the sliding curved surface G2*f* of the chain guide G2 and chain guide-opposing side peripheral edge portions in which the respective curved surface portions opposed to the chain guides of the outer link plate and inner link plate 120, can be prevented. That is when a width of a certain outer link plate 110A along the length of the chain is macroscopically viewed, contact positions between a side edge portion of the link plate 110A and a sliding curved surface G2*f* of the arc-shaped chain guide G2 are two in total (see the four positions in total in FIGS. 6(*a*), 6(*b*) and 6(*c*) of the illustrated prior art as a reference). Accordingly, an interruption of film formation of lubricating oil between a traveling chain and a sliding curved surface of the chain guide due to an influence of a clearance between a connecting pin and a bushing is prevented so that sliding resistance of the chain can be reduced and the amount of wear on the guide surfaces of the chain guides can be reduced.

Particularly, in a case where as shown in FIG. 1, both the arc-shaped chain guide G2 having the sliding curved surface G2*f* and the linear chain guide G1 having the sliding flat surface G1*f* are arranged on outer peripheral sides of the transmission chain 100, since the sliding resistance in a sliding flat surface of the linear chain guide can be significantly reduced and wear of the sliding flat surface can be significantly suppressed, the effect that life of the linear chain guide can be significantly increased is remarkably obtained.

It is noted that although, in the outer link plate 110 of the example shown in FIG. 2(*a*), the curved surface portion 110*a* opposed to a chain guide is formed with a width of $P_2$ in a side edge portion, which slides on a sliding curved surface G2*f* of the arc-shaped chain guide G2, and on the other hand, in the inner link plate 120 shown in FIG. 2(*b*), the curved surface portion 120*a* opposed to a chain guide is formed with a width of $P_1$ in a side edge portion, which slides on a sliding curved surface G2*f* of the arc-shaped chain guide G2, the present invention is not limited thereto. Since as described above, it is enough for the present invention only to satisfy the equations (1) and (2), on the contrary to the example shown in FIG. 2(*a*) in the outer link plate 110, the curved surface portion 110*a* opposed to a chain guide may be formed with a width of $P_1$ in a side edge portion, which slides on a sliding curved surface G2*f* of the arc-shaped chain guide G2, and on the other hand, in the inner link plate 120, the curved surface portion 120*a* opposed to a chain guide may be formed with a width of $P_2$ in a side edge portion, which slides on a sliding curved surface G2*f* of the arc-shaped chain guide G2.

Further, although, in the above-mentioned example, a case where the transmission chain according to the present invention is used in a chain drive system including an arc-shaped chain guide only on an outer peripheral side of the transmission chain, was shown, the transmission chain of the present invention may be applied to a chain drive system including an arc-shaped chain guide on the respective outer and inner peripheral sides of the transmission chain. However, in this case, each of the outer and inner link plates in the transmission chain may be provided with a curved surface portion opposed to a chain guide with a predetermined width on both outer and inner peripheral side edge portions.

Further, in the above-mentioned example, a case where the present invention was applied to a bushing chain was described. However, the present invention is not limited to this case and it may be applied to another chain if the chain is comprised of bushings press-fitted in at least a pair of inner link plates and connecting pins press-fitted in a pair of outer link plates in such a manner that the pin is loosely fitted in the bushings on the inner circumferential sides of the bushings.

Further, in the above-mentioned example, the present invention was applied to one row of chain. However, the present invention may be applied to a plurality of rows of chain such as a two-rows chain or a three-rows chain.

Finally methods of forming the respective curved surface portion 110a opposed to a chain guide and curved surface portion 120a opposed to a chain guide of the outer link plate 110 and the inner link plate 120 of the transmission chain 100 will be described below.

Connecting pins 130 are press-fitted into an outer link plate 110 and bushings 140 are press-fitted into an inner link plate 120. The connecting pin 130 and the bushing 140 are each press-fitted in a hole smaller than their respective diameters.

In a process of producing the transmission chain 100 when the connecting pin 130 and the bushing 140 are press-fitted, the link plates are deformed so that curved portions (110a, 120a) opposed to a chain guide, respectively formed in the link plates are deformed.

Here, when for example, a connecting pin having a diameter of 1.2 mm is press-fitted into a hole having a diameter of 1.0 mm and a connecting pin having a diameter of 1.2 mm is press-fitted into a hole having a diameter of 0.8 mm, the fitting force of the latter is high. Namely, the press-fitting output of a bushing having a larger diameter is larger than the press-fitting output of a connecting pin having a smaller diameter.

And as the press-fitting output is increased, the deformation of the link plates (110, 120) is increased. Thus, when a case where the connecting pin 130 is press-fitted into the outer link plate 110 is compared with a case where the bushing 140 is press-fitted into the inner link plate 120, the deformation of the link plate is increased more in the case of the inner link plate 120.

Thus, when curved portions (110a, 120a) having the same curvature are formed in the outer link plate 110 and the inner link plate 120, a curvature of the inner link plate 120 is previously increased so as to obtain a relationship of (curvature of the outer link plate)<(curvature of the inner link plate) while taking a difference of deformation between the both link plates 110 and 120 into consideration. Accordingly, the curved portion in the inner link plate is not decreased during press-fitting.

The invention claimed is:

1. In combination with a pair of spaced-apart sprockets having projecting teeth with a given thickness, and at least one arc-shaped chain guide between said sprockets, said chain guide having a sliding curved surface, a transmission chain comprising bushings press-fitted in a pair of inner link plates and connecting pins press-fitted in a pair of outer link plates, the pins being fitted into the bushings with a selected measurable clearance C greater than zero to permit rotation of said bushings on said pins, said pins having a chain pitch of $P_1$, said chain adapted to travel between said pair of spaced-apart sprockets and along said arc-shaped chain guide sliding curved surface, said bushings being spaced apart and dimensioned to engage between the teeth of the sprockets to drive the chain, said inner and outer link plates being spaced apart a distance greater than said given thickness to straddle the teeth of the sprockets, and having guide-opposing-side peripheral edge portions adapted to travel along the sliding curved surface of the chain guide, wherein each of said guide-opposing-side peripheral edge portions being a curved surface, said curved surface of one of said outer and inner link plates having a first curve width X in the longitudinal direction of said chain, said width satisfying Equation 1, and the curved surface of the other of said outer and inner link plates, having a second curve width Y, said width satisfying Equation 2, Equation 1 being $P_1 \leq X \leq (P_1+C)$, and Equation 2 being $P_1+\{(P_1+C)-X\}=Y$.

2. A combination according to claim 1 including another chain guide between said sprockets having a length with a flat shoe surface, characterized in that each of the links has a non-chain guide-opposing-side peripheral edge surface opposite the curved surface of said link, said opposite surface being flat, to provide an exposed flat surface along the length of said flat chain guide.

3. A combination according to claim 1 characterized in that said first and second curve widths (X and Y) are different.

4. A combination according to claim 1 characterized in that said outer link plates have said first curve width X and said inner link plates have said second curve width Y.

* * * * *

UNITED STATES PATENT AND TRADEMARK OFFICE
CERTIFICATE OF CORRECTION

PATENT NO.         : 7,585,239 B2
APPLICATION NO. : 11/200612
DATED                 : September 8, 2009
INVENTOR(S)       : Toshihiko Miyazawa It is certified that error appears in the above-identified patent and that said Letters Patent is hereby corrected as shown below:

On the Title Page, insert the Foreign Application Priority data as follows:

Item -- (30)    Foreign Application Priority Data

Oct. 7, 2004    (JP) .............................. 2004-295181 --

Signed and Sealed this

Seventeenth Day of November, 2009

David J. Kappos
*Director of the United States Patent and Trademark Office*